April 16, 1968     J. J. ROBERTS ET AL     3,378,449

NUCLEAR REACTOR ADAPTED FOR USE IN SPACE

Filed July 27, 1967     3 Sheets-Sheet 2

Inventors
John J. Roberts
Edward J. Croke
Attorney

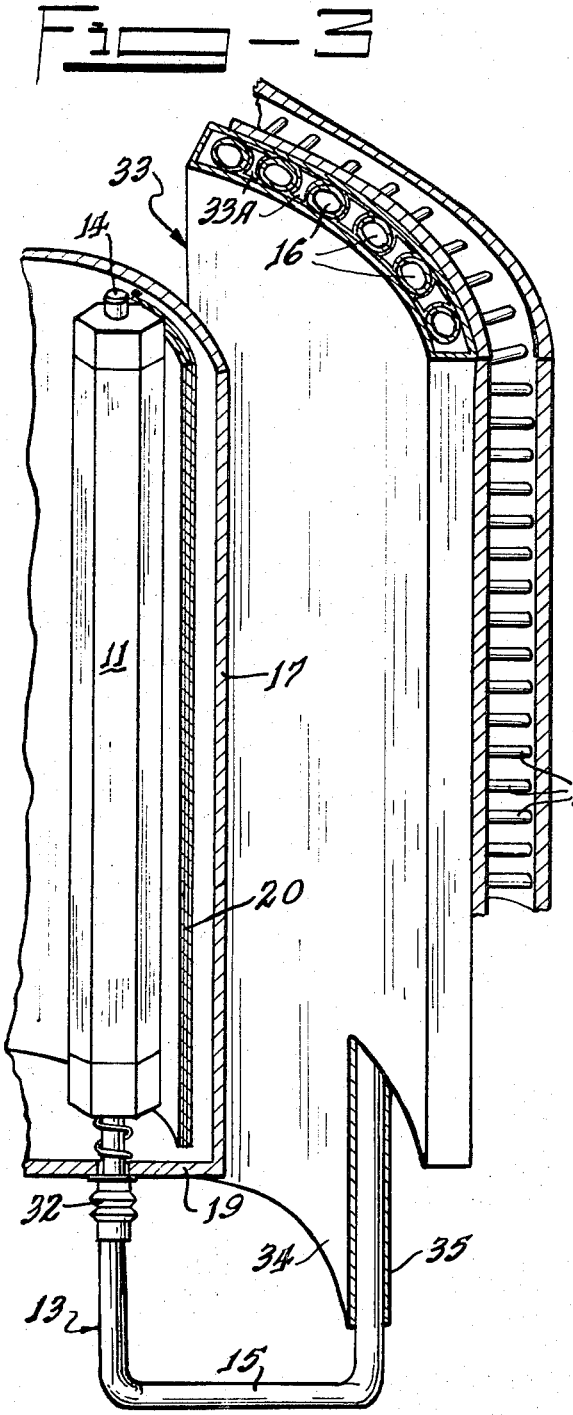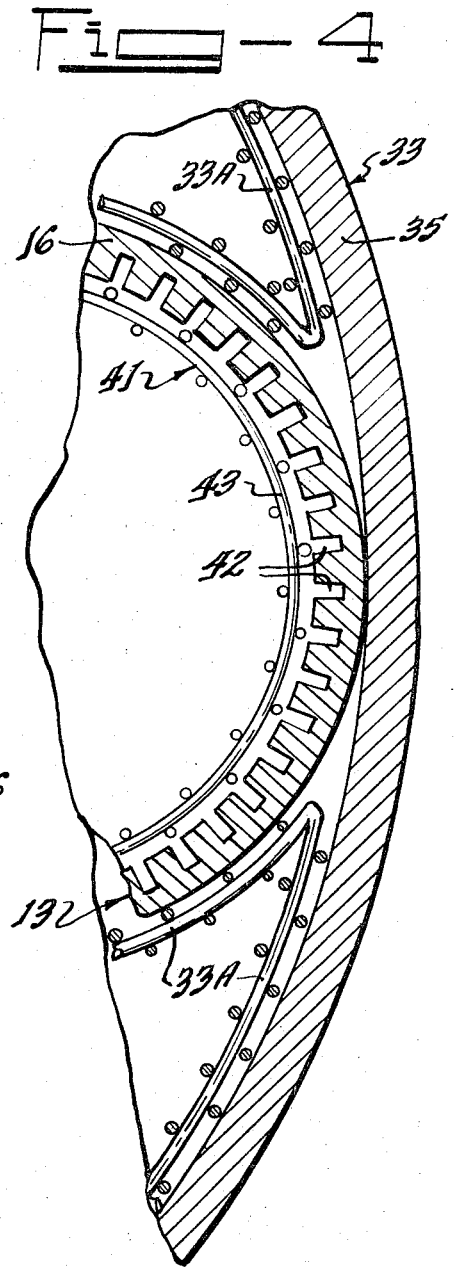

United States Patent Office 3,378,449
Patented Apr. 16, 1968

3,378,449
NUCLEAR REACTOR ADAPTED FOR
USE IN SPACE
John J. Roberts, Chicago, and Edward J. Croke, River Forest, Ill., assignors to the United States of America as represented by the United States Atomic Energy Commission
Filed July 27, 1967, Ser. No. 656,996
10 Claims. (Cl. 176—33)

ABSTRACT OF THE DISCLOSURE

A nuclear reactor for use in space incorporating plutonium monophosphide as fuel, heat pipes employing lithium as working fluid to conduct the heat developed in the fuel to thermoelements, and heat pipes employing potassium as working fluid for rejecting waste heat to space.

Contractual origin of the invention

The invention described herein was made in the course of, or under, a contract with the United States Atomic Energy Commission.

Background of the invention

This invention relates to a nuclear reactor adapted for use in space. In more detail, the invention relates to a fast spectrum nuclear reactor power supply for a space mission having a low-power requirement.

As opportunities for launching satellites and space probes become increasingly available to military, scientific, and commercial users, the demand for low-power electrical supplies in the 1–10 kwe. range will increase. Projected requirements for manned space laboratories also fall within this power range. Ideally, these demands should be met by a single system which can be integrated into this complex of foreseeable missions.

While power sources employing radioisotopes are potentially available in the power ranges under consideration, the limited availability of suitable radioisotopes severely limits the potential of such power plants. In addition and in view of the limited availability of the radioisotopes, it is expected that the fuel cost for such a power source would be higher than for a nuclear reactor power source. Other reactor designs have also been suggested for the power ranges under consideration, but all are much heavier than the system disclosed herein.

It is accordingly an object of the present invention to develop a compact, fast-spectrum nuclear reactor adapted for use in space.

It is another object of the present invention to develop a relatively light-weight and low-cost fast-spectrum nuclear reactor power supply which has high intrinsic reliability.

Summary of the invention

According to the present invention, a fast-spectrum nuclear reactor power supply includes:
(a) A core containing plutonium monophosphide or other high-temperature material as fuel,
(b) A plurality of "heat pipes" containing lithium as the working fluid to conduct the heat developed in the fuel to the hot junction of
(c) A plurality of thermoelectric elements, and
(d) A plurality of heat pipes containing potassium as the working fluid for rejecting waste heat to space.

A heat pipe is a device for transferring very high heat fluxes. A hollow pipe contains a fluid which is continuously evaporating and condensing. Application of heat to one section of the pipe causes the fluid to vaporize. Vapors fill the entire pipe and are condensed in another section of the pipe. Condensed liquid is returned to the heated section of the pipe by means of a wick structure. A complete discussion of such devices is contained in LA–3211 entitled, "High Thermal Conductance Devices Utilizing the Boiling of Lithium or Silver," which is available from the Clearinghouse for Federal Scientific and Technical Information, U.S. Department of Commerce, Springfield, Va.

Brief description of the drawing

FIG. 3 is a perspective view showing the path taken by the heat developed in a single fuel element,
FIG. 4 is a partial sectional view taken through one heat pipe employed in the present invention,
FIG. 6 is a schematic perspective view of portions of the reactor showing how the containment vessel serves as the main structural support for the reactor.

Description of the preferred embodiment

Figure 1:
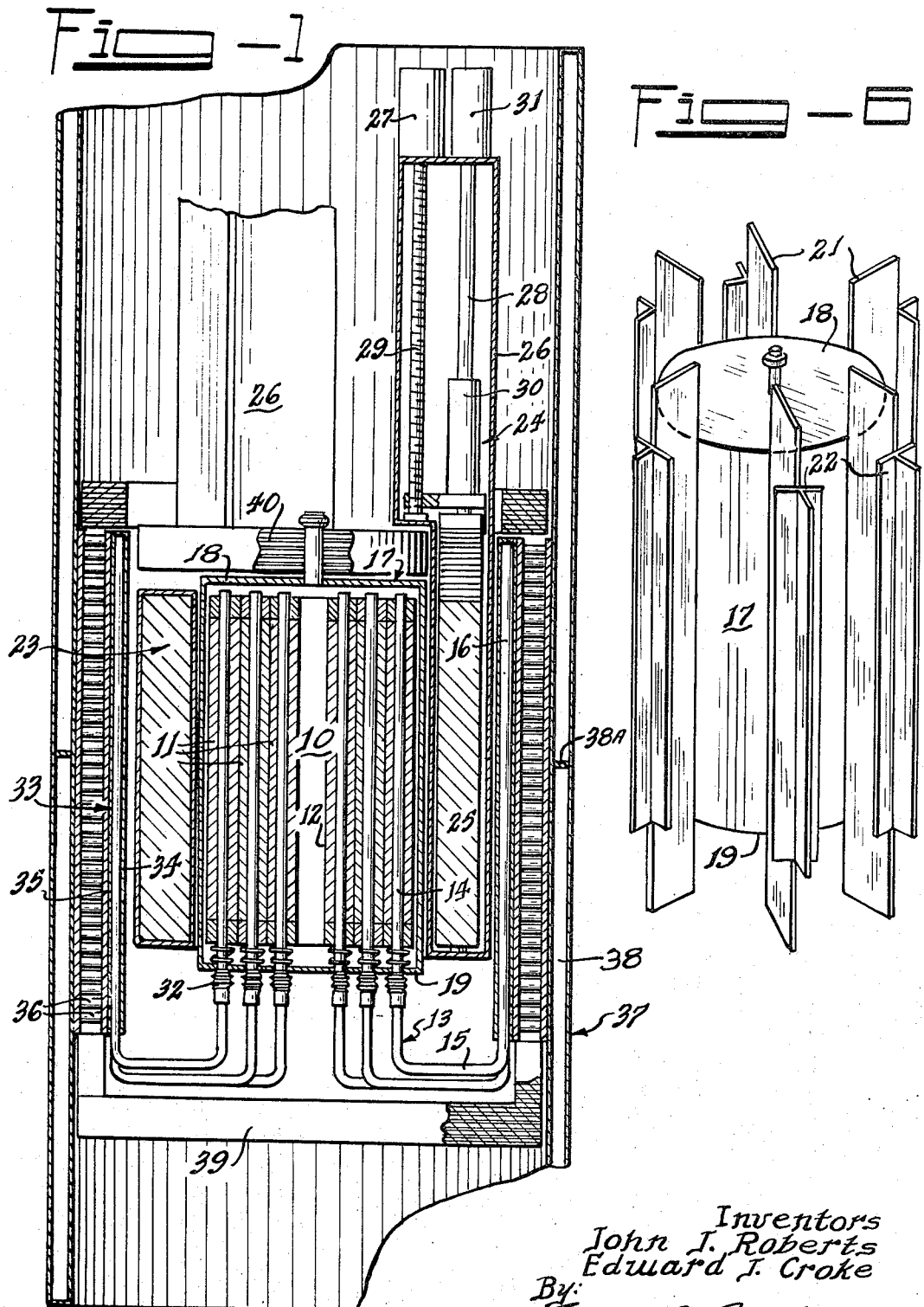
FIG. 1 is a diagrammatic longitudinal sectional view of a power source according to the present invention.
Figure 2:
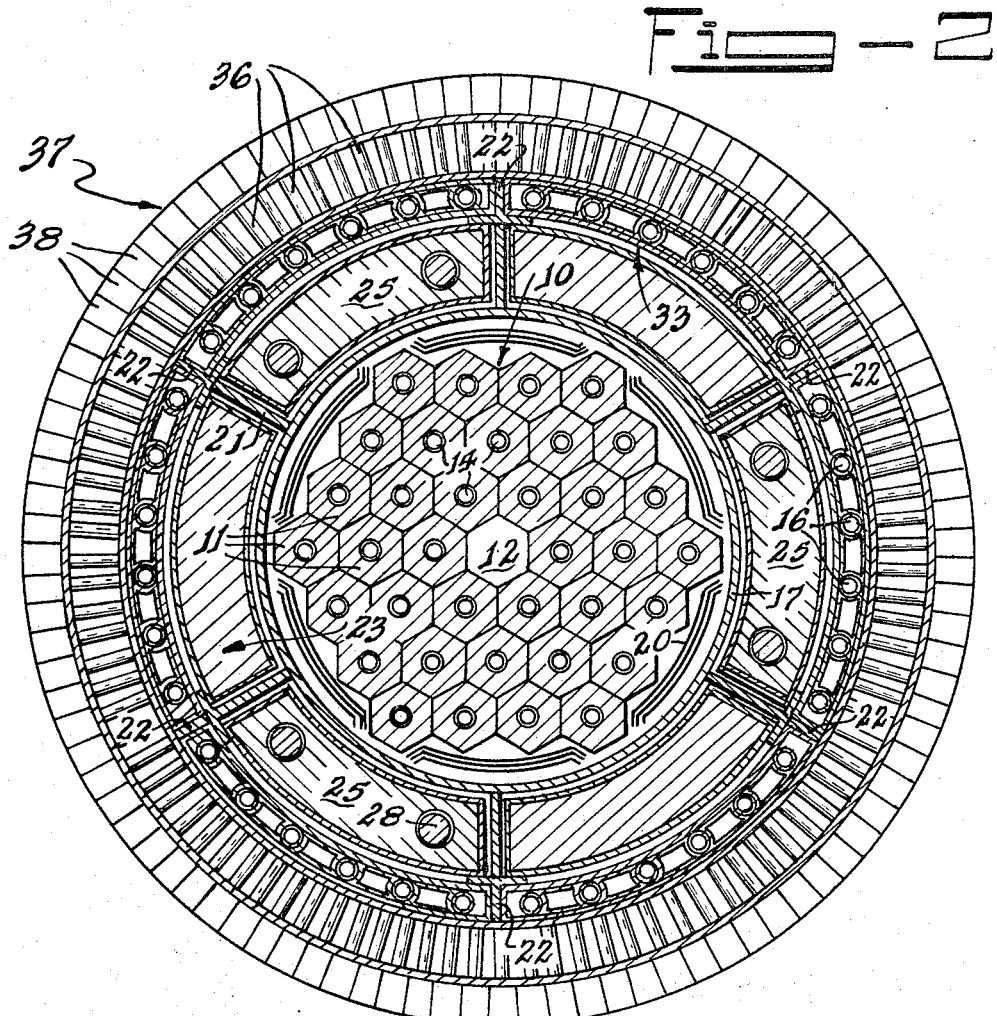
FIG. 2 is a transverse sectional view thereof.

The nuclear reactor power supply according to the present invention comprises a core 10 consisting of an aggregate of 36 unclad fuel elements 11—each being hexagonal in cross section, 2.6 cm. across flats and 30 cm. long. Fuel elements 11 are arranged in three hexagonal rings about a central opening 12. The fuel is plutonium monophosphide which has thermodynamic, chemical and physical properties which are markedly superior to the more popular plutonium dioxide and plutonium carbide and the fissionable constituent of the fuel is plutonium-239. It will be appreciated that any solid fuel having a high melting temperature and suitable thermodynamic, chemical and physical properties may be used. A good alternative is a cermet consisting of 30% molybdenum in $U^{233}O_2$.

Heat developed in each of the fuel elements 11 is removed therefrom by a primary heat pipe 13 formed of niobium—1% zirconium which consists of a vaporizing section 14 extending longitudinally through each fuel element 11, a transition section 15 in which the heat pipe makes two 90° turns, and a condensing section 16 which is parallel to vaporizing section 14. Heat pipes 13 will be described in detail hereinafter.

Core 10 is contained within a cylindrical niobium—1% zirconium core containment vessel 17 having a top head 18 and a bottom head 19. Six radial shielding segments 20, which serve to minimize thermal radiative heat transfer from the core to the reflector, are situated in that portion of the cylindrical containment vessel which is not occupied by the hexagonal core. Protruding outwardly from containment vessel 17 are six equidistant radial ribs 21 having T-shaped mounting brackets 22 attached thereto (see FIG. 6) which provide mounting and structural support for many of the components of the power supply.

An annular reflector 23 consisting of six 60° segments separated by ribs 21 surrounds core 10. Reflector 23 is 5 cm. thick and is composed of beryllium oxide. Three of the six reflector segments are movable for control of the reactor. A control module 24 consists of a reflector segment 25 mounted for vertical movement on a shaft 28 in shroud 26. A motor 27 operating through lead screw 29 is used to move reflector segment 25. Also provided are scram springs 30 and shock absorber 31. Provision of reflector 17 permits the required fuel loading to be reduced from about 60 kg. for a bare core to 38 kg. The reflector also flattens the core radial power profile and thereby tends to equalize the thermal load on the heat pipes. In addition, the reflector serves as a radiation shield for the thermoelements.

Reflector control is used only for startup of the reactor, the steady-state operating condition being maintained by means of totally passive temperature-coefficient control.

Heat pipes 13 emerge from containment vessel 17 through bottom head 19 via a flexible, welded, niobium bellows 32. Accordingly, differential expansion of heat pipes 13 and the containment vessel 17 is accommodated without imposing excessive thermal stresses on the heat pipes or comprising the gas-tight integrity of the vessel.

Heat pipes 13 are not bonded to the fuel elements 11. The containment vessel is maintained under one atmosphere of helium. Accordingly, heat transfer from the fuel across a 2-mil gap to the heat pipe is by radiation and conduction through the helium; however, conduction is the dominant mode.

Surrounding reflector 23 is high-temperature shell 33 through which pass condensing sections 16 of primary heat pipes 13. Primary heat pipes 13 are disposed between and in contact with inner and outer cylindrical walls 34 and 35, respectively. High-temperature shell 33 is formed into six segments which are mounted on radial ribs 21. It is 33.4 cm. in diameter and 44 cm. long. 2222⅜" diameter thermocouples 36 of the type of those described in AFAPL-TR-64-1235, Air Force Aero Propulsion Laboratory, Wright-Patterson Air Force Base, Ohio (December 1964) are mounted on the exterior surface of high-temperature shell 33. Conventional equipment (not shown) is employed for the collection of electrical current generated by the thermocouples 36.

Wicks 33A of the same type as the screen mesh wicks employed in primary heat pipes 13 to be described hereinafter are employed in the space in high-temperature shell 33 between condensing sections 16 of primary heat pipes 13. These wicks assist in transferring heat across the high-temperature shell. While this is the preferred construction, the high-temperature shell may also be of solid construction with the primary heat pipes passing through solid niobium—1% zirconium.

While thermoelectric conversion devices are specified, other heat-to-electricity conversion devices can also be used. For example, an excellent alternative would be thermionic conversion devices of the type described in "Development of an Insulated Thermionic Converter Heat Pipe Assembly," AFAPL-TR-66-33 (May 1966) and such an arrangement has potentially a much greater efficiency than an assembly employing thermoelectric conversion devices. However, thermionic converters are not as well developed as are thermoelectric converters.

Heat is rejected to space from thermocouples 36 by radiator assembly 37 which is composed of 100 rectangular-cross-section, double-ended heat pipes 38. The radiator assembly is fabricated from 20-mil inconel tubing and takes the form of a 43 cm. O.D., 113 cm. long, cylindrical shell.

An axial thermal radiation shield 39 is disposed surrounding transition portions 15 of primary heat pipes 13 to reduce radiative heat loss. A similar axial shield 40 suppresses radiative heat losses from the other end of the core.

Since heat pipes 13 and 38 form an important part of the present invention, they will next be described in detail. As shown in FIG. 4, heat pipes 13 are circular in cross section. All heat pipes 13 are identical in cross section and heat-transfer capacity and are sized to accommodate the peak power generated in each of the six members of the inner ring of fuel elements 11. The operating temperature of the primary heat pipes corresponds to 1200° C. thermoelement hot junction temperature. At 1200° C. lithium is the best choice for the heat pipe fluid and accordingly is employed. The heat pipes are constructed of niobium—1% zirconium alloy, since tests at Los Alamos Scientific Laboratory have proven the compatibility of lithium and this alloy at high temperatures.

Heat pipe wick 41 consists of both a large number of rectangular channels 42 milled in the inner surface of the heat pipe walls and a screen-mesh 43 disposed in contact with the heat pipe walls. The grooved-channel approach, wherein the wick consists of an array of rectangular channels milled into the inner surface of the heat pipe wall, has the significant advantage that the wick cannot, under any circumstances, separate from the wall and thereby produce hot spots. The grooved-channel wick also lends itself to analysis more readily than does the screen-mesh wick. An open-channel wick does, however, suffer the disadvantage that the capillary forces associated with it are approximately half those of a screen-mesh wick. The open channel is, moreover, sensitive to a start-transient problem in that, at low temperatures, an interaction between the high-velocity vapor and the liquid surface tends to retard the flow of the liquid and prevent startup.

Although its performance characteristics are more difficult to define, the screen-mesh wick is superior to the grooved-channel type as a capillary pump, and it is relatively insensitive to the start-transient, vapor-liquid interaction previously described.

Thus the primary heat pipes employed in accordance with the present invention are constructed so as to combine the advantages of both types of heat pipe. Fifty-one rectangular channels 42, having a depth of 0.510 mm. and a width of 0.204 mm. (shape factor of 1.2) are equally spaced around the inner surface of 0.762 mm. (30 mil) thick walls of the heat pipe 13. The effective channel capillary pore radius of 0.102 mm. is sufficient to wick the liquid lithium to a height of 45 cm. against the equivalent of one gravity. This wicking height corresponds to the length of the evaporator leg of the U-shaped heat pipe; thus, the core-primary heat pipe subassembly can function in earth-normal gravity for ground testing of the space system and can, moreover, be readily adapted for terrestrial or undersea use.

The channels are sized to carry the full 0.88 kw. heat load of the high-temperature central elements; however, additional capacity is provided by a single layer of niozium—1% zirconium screen 43 in close contact with the inner surface of the pipe. This 0.22 mm. thick screen has an equivalent pore radius of 0.08 mm., a permeability of 12, and a void fraction of 0.5. It is included primarily in order to facilitate the startup of the system, since it will serve as a barrier between the vapor and the liquid during the low-temperature portion of the start transient; however, it also adds the equivalent of about 148 watts of heat-transfer capacity to the reference pipe.

Figure 5:
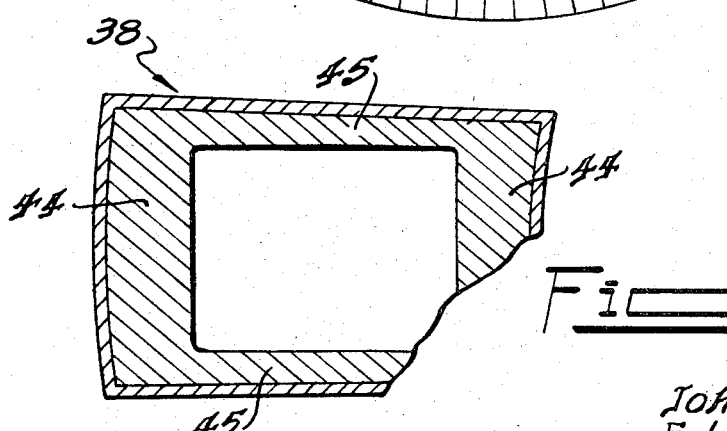
FIG. 5 is a partial sectional view taken through another heat pipe employed in the present invention.

Radiator assembly 37 consists of an array of 100 rectangular-cross-section heat pipes 38 (see FIG. 5), which form a cylindrical shell around the thermoelectric elements, the thermoelectric elements being off-center with respect to the heat pipes 38. Each pipe contains a transverse partition 38A at the point of zero axial vapor velocity, so that the complete radiator consists of 200 independent cells. The radiator is sized to reject 26.4 kwt. at 500° C. with an effective emissivity of 0.85. Its over-all length is 113.5 cm.

The configuration and operation of heat pipes 38 is unusual in several respects. First, the heat pipes are double-ended, that is, heat is added in the central portion of the pipe and the axial vapor flow is in two directions. Secondly, the rectangular shape of the tube coupled with the fact that the heat is added only to the inner surface of the heat pipe creates an unusual flow within the pipe. The vapor produced in the evaporator section on the inner radius of the radiator shell condenses on the outer radius and flows back to the evaporator via an "upper" and a "lower" wick 44 joined by lateral wick 45. Inconel is the material of construction of the pipe and potassium the working fluid.

The radiator heat pipes cannot be ground-tested in a vertical position, since the wick will not lift the working fluid to the extent necessary. However, ground testing can be carried out in a horizontal position.

One of the primary advantages of a heat pipe radiator is its relative invulnerability to meteor damage. The present design incorporates 200 independent cells so that the puncture of any one heat pipe reduces the capacity of the radiator by less than one percent. In view of the fact that the radiator is oversized by 10%, a reasonable rate of attrition of the heat pipes may be tolerated and no meteor armor is required.

The following table gives the parameters for a reactor according to the present invention. It will be appreciated that the design has not been optimized and that variations in detail may be desirable to obtain optimum results.

Core:
- Type _____ Fast, reflected
- Active length _____ cm __ 30
- Critical diameter _____ cm __ 16.6

Plutonium monophosphited fuel:
- Fuel density at operating temperature g./cc __ 8.41
- Fuel, v/o in core _____ 67.5
- Reference thermal power _____ kwt __ 27.5
- Peak fuel temperature _____ ° C __ 1269
- Fuel weight _____ lbs __ 8.49

Fuel elements:
- Configuration _____ Hexagonal
- Across flats _____ cm __ 2.6
- Central hole diameter _____ cm __ 1.12
- Cladding _____ None
- Number of elements _____ 36
- Average power per element _____ kwt __ 0.764
- Limiting temperature capability at 1 atm. He _____ ° C __ 1700

Radial reflector:
- Material _____ Beryllium oxide
- Density at operating temperature ____ g./cc __ 2.6
- Melting point _____ ° C __ 2550
- Cylindrical O.D. _____ cm __ 29.9
- Length _____ cm __ 30
- Thickness _____ cm __ 5
- Weight _____ lbs __ 65.49
- Axial reflector _____ None Primry heat pipes:
- Material _____ Niobium—1% zirconium
- Evaporator length _____ cm __ 30
- Transistor section length _____ cm __ 23
- Condenser length _____ cm __ 44
- Outside diameter _____ cm __ 1.111
- Wall thickness (40 mils) _____ cm __ 0.101
- Channel wick:
  - Number of channels _____ 51
  - Channel width _____ mm __ 0.204
  - Channel depth _____ mm __ 0.510
- Screen wick:
  - Thickness _____ mm __ 0.22
  - Porosity _____ 0.5
  - Permeability _____ 12
  - Pore radius _____ mm __ 0.08
- Working fluid _____ Lithium
- Reference design power _____ kwt __ 0.88
- Operating pressure _____ p.s.i.a __ 5.3
- Operating temperature _____ ° C __ 1200
- Vapor pressure drop (reference power) _____ p.s.i.d __ 0.0235
- Liquid pressure drop _____ p.s.i.d __ 0.1544
- Vapor temperature drop _____ ° C __ 0.655

Radiator heat pipes:
- Material _____ Inconel
- Total length _____ cm __ 113.5
- Evaporator length _____ cm __ 44
- Condenser length _____ cm __ 113.5
- Width _____ cm __ 1.35
- Height _____ cm __ 2.0
- Wall thickness (20 mils) _____ cm __ 0.051
- Screen wick:
  - Inner and outer wick thickness __ cm __ 0.314
  - Lateral wick thickness _____ cm __ 0.1517
  - Porosity _____ 0.5
  - Permeability _____ 12
  - Pore radius _____ 0.025
- Working fluid _____ Potassium
- Reference design power per pipe _____ kwt __ 0.264
- Operating pressure _____ p.s.i.a __ 0.5
- Operating temperature _____ ° C __ 500
- Vapor pressure drop _____ p.s.i.a __ 0.005
- Liquid pressure drop _____ p.s.i.a __ 0.005
- Vapor temperature drop _____ ° C __ 2.93
- Total wall temperature drop _____ ° C __ 11.9

Hot shell:
- Material _____ Niobium—1% zirconium
- operating temperature _____ ° C __ 1200
- Thickness _____ cm __ 1.3
- Outside diameter _____ cm __ 33.5
- Length _____ cm __ 44

Core containment vessel:
- Material _____ Niobium—1% zirconium
- Outside diameter (cylindrical) _____ cm __ 30.3
- Length _____ cm __ 32.8
- Radial wall thickness _____ cm __ 0.25
- End cap thickness _____ cm __ 0.5

Axial thermal radiation shields:
- Material _____ Niobium—1% zirconium
- Lamina thickness _____ in __ 0.030
- Number of laminae _____ 17
- Total thickness _____ cm __ 3.95
- Diameter _____ cm __ 37.50
- Temperature of radiating surface _____ ° C __ 364

Thermoelectric generator:
- Hot junction temperature _____ ° C __ 1200
- Cold junction temperature _____ ° C __ 510
- Number of thermocouple pairs _____ 2222
- Power per couple _____ w __ 0.495
- Total power (reference thermoelectric) kwe __ 1
- Voltage (reference) _____ volts __ 40

It will be understood that the invention is not to be limited to the details given herein but that it may be modified within the scope of the appended claims.

The embodiments of the invention in which an exclusive property or privilege is claimed are defined as follows:

1. A nuclear reactor adapted for use in space comprising a core consisting of a plurality of fuel elements formed of a fissionable material having a high melting point, means for converting heat to electricity surrounding said core, a primary heat pipe extending longitudinally through each fuel element and terminating adjacent said means for converting heat to electricity, and a plurality of secondary heat pipes disposed adjacent to said means for converting heat to electricity for rejecting waste heat to space.

2. A nuclear reactor according to claim 1 wherein said fuel elements are formed of plutonium phosphide.

3. A nuclear reactor according to claim 1 wherein lithium is the working fluid in the primary heat pipes and potassium is the working fluid in the secondary heat pipes.

4. A nuclear reactor according to claim 1 wherein the means for converting heat to electricity are a plurality of thermoelectric elements.

5. A nuclear reactor according to claim 1 and including a reflector having a movable portion disposed between the core and the means for converting heat to electricity.

6. A nuclear reactor according to claim 1 wherein the primary heat pipes extend longitudinally through a high-temperature shell and said high-temperature shell includes a wick to assist in transferring heat across the shell.

7. A nuclear reactor according to claim 1 wherein said primary heat pipes are circular in cross section and incorporate both a rectangular grooved-channel wick in the inner surface of the heat-pipe wall and a screen-mesh wick in the heat pipe adjacent the wall of the heat pipe.

8. A nuclear reactor according to claim 1 wherein said secondary heat pipes are rectangular in cross section and incorporate a screen-mesh wick in the heat pipe adjacent the four walls of the heat pipe and wherein heat is added only to the central portion of one side of the heat pipe.

9. A nuclear reactor according to claim 1 wherein the inner and outer wicks in said secondary heat pipes are thicker than the lateral wicks and wherein the secondary heat pipes contain a transverse partition at the point of zero axial vapor velocity.

10. A nuclear reactor adapted for use in space comprising a core consisting of a plurality of elongated fuel elements formed of plutonium monophosphide, a reflector having a movable portion disposed around the core, a high-temperature shell including an inner wall and an outer wall disposed around the reflector, a plurality of thermoelectric elements surrounding and in contact with said high-temperature shell, a primary heat pipe having a vaporizing section extending longitudinally through each fuel element, a transition section wherein there are two 90-degree bends, and a condensing section extending longitudinally through the high-temperature shell, said high-temperature shell including a wick to assist in transferring heat across the shell, said primary heat pipe containing lithium as the working fluid, being circular in cross section and incorporating both a rectangular grooved-channel wick in the inner surface of the heat pipe wall and a screen-mesh wick in the heat pipe adjacent the wall of the heat pipe, and a plurality of secondary heat pipes disposed adjacent to said thermoelectric elements for rejecting waste heat to space, said secondary heat pipes containing potassium as the working fluid, being rectangular in cross section, and incorporating a screen-mesh wick in the heat pipe adjacent the four walls of the heat pipe, the inner and outer wicks being thicker than the lateral wicks, heat being added only to the central portion of one side of the secondary heat pipes, and the secondary heat pipes containing transverse partitions at the point of zero axial vapor velocity.

References Cited

UNITED STATES PATENTS

| | | | |
|---|---|---|---|
| 3,089,840 | 5/1963 | Carter et al. | 176—53 |
| 3,160,568 | 12/1964 | MacFarlane | 176—39 |
| 3,229,759 | 1/1966 | Grover | 165—105 |
| 3,243,613 | 3/1966 | Grover | 176—39 |
| 3,262,820 | 7/1966 | Whitelaw | 136—202 |
| 3,287,225 | 11/1966 | Ackroyd et al. | 176—33 |
| 3,302,042 | 1/1967 | Grover et al. | 176—39 |
| 3,305,005 | 2/1967 | Grover et al. | 165—105 |

L. DEWAYNE RUTLEDGE, *Primary Examiner.*